United States Patent [19]

Schwarz

[11] Patent Number: 4,546,304
[45] Date of Patent: Oct. 8, 1985

[54] ELECTRONIC DEVICE WITH CHOKE INVERTER

[75] Inventor: Gerhard Schwarz, Altena, Fed. Rep. of Germany

[73] Assignee: Braun Aktiengesellschaft, Kronberg, Fed. Rep. of Germany

[21] Appl. No.: 592,500

[22] Filed: Mar. 23, 1984

[30] Foreign Application Priority Data

Mar. 24, 1983 [DE] Fed. Rep. of Germany ....... 3310678

[51] Int. Cl.⁴ .............................................. G05F 1/56
[52] U.S. Cl. .................................. 323/287; 323/222; 363/143
[58] Field of Search ............... 323/278, 284, 286, 287, 323/222; 331/112, 113 R

[56] References Cited

U.S. PATENT DOCUMENTS

| 3,461,377 | 8/1969 | Reese | 323/22 |
| 3,553,568 | 1/1971 | Saba | 323/9 |

FOREIGN PATENT DOCUMENTS

| 1203863 | 10/1965 | Fed. Rep. of Germany . | |
| 2532945 | 5/1976 | Fed. Rep. of Germany . | |
| 860034 | 8/1981 | U.S.S.R. | 323/286 |
| 920666 | 4/1982 | U.S.S.R. | 323/287 |

Primary Examiner—Peter S. Wong
Assistant Examiner—Judson H. Jones
Attorney, Agent, or Firm—Raymond J. De Vellis

[57] ABSTRACT

A constant voltage or constant current output circuit is disclosed which can be operated with input voltages which fluctuate sharply at nearly any frequency. A pulse width modulated (PWM) switching transistor is used with a choke inverter. The PWM switching transistor is input and output level responsive. A second transistor is connected to the switching transistor and is used to block operation of the switching transistor. The electronic device according to the invention supplies a constant output voltage even at input voltages between 70 and 264 volts and stimulates oscillation absolutely reliably even under maximum load. In addition, the device is suitable for DC and AC voltages of any frequency and merely requires a simply designed voltage regulating circuit that uses only ordinary components.

6 Claims, 2 Drawing Figures

ELECTRONIC DEVICE WITH CHOKE INVERTER

BACKGROUND OF THE INVENTION

1. Field of the Invention

The present invention relates to an electronic circuit for supplying current to an electrical device from a source of alternating or direct current with different voltage levels.

2. Description of the Prior Art

Electronic devices are known for supplying constant voltage and/or constant current to electrical or electronic appliances which are built as choke inverters, primarily or secondarily pulsed blocking or conducting oscillators or as push-pull oscillators. As a rule, they include a rectifier circuit with a filtering and smoothing arrangement connected downstream, to which a transformer or choke is connected. In the case of a choke inverter, an electronic switch or switching transistor is provided in series with the choke and the electrical device, the switch or transistor being switched on and off as a function of one or more control parameters, whereby the energy stored in the choke in the blocked phase of the electronic switch is delivered to the electrical device via a diode with the correct polarity.

A literature reference, "Transistor-Handbuch" (Transistor Handbook) by Jan-Hendrik Jansen (Franzis-Verlag, 1980, pp. 347–354), teaches an electronic device with a choke inverter, wherein an input alternating voltage is applied to a power rectifier, the voltage then being filtered and smoothed before being applied to a switching transistor. A choke is connected downstream of the switching transistor, to which choke a load with a capacitor connected in parallel is connected on the output side. A diode is connected to the load or capacitor on the one hand and on the cathode side to the connection of the switching transistor with the choke. At the load, a measuring circuit measures the amount by which the output voltage determined by the switching times of the switching transistor differs from a reference voltage supplied by the measuring circuit. Variations are fed to a pulse generator which adjusts the width of the control pulses accordingly. The pulses are transmitted to the switching transistor via a control circuit.

To operate an electrical appliance such as an electrical dry shaver, an electronic flash unit, a radio or television set or the like, independently of line voltage, the electrical appliances include a rechargeable battery, for which a regulating circuit must be provided to charge the battery with a constant current, the regulating circuit ensuring a constant output current for charging the battery even with fluctuations in the input voltage varying from 90 to 240 volts, for example. This is particularly necessary when so-called nickel-cadmium batteries are involved, whose charging current may vary only within a very narrow range, since otherwise there would be the danger of the expensive nickel-cadmium cells being destroyed. It is also desirable to connect the electrical appliance in question to different line voltages and frequencies, without having to change the switch setting, something which is frequently foregotten anyway, thereby endangering the electrical appliance in question.

SUMMARY OF THE INVENTION

The goal of the present invention is to provide an electronic circuit with a choke inverter which ensures a constant output voltage or constant output current even when the input voltages fluctuate sharply at nearly any frequency, the electronic circuit utilizing a regulating circuit with a simple design and ordinary components, and ensuring stimulation of oscillation of the choke inverter even under maximum load.

This goal is achieved according to the invention by virtue of the fact that a first resistor is provided in the connection between the connecting lead of the switching transistor and the choke, parallel to which a series circuit composed of a first zener diode is connected with the base-emitter lead of a second transistor, whose collector is connected with the base of the switching transistor, which is connected via a feedback winding, coupled magnetically to the choke, to the connection of the choke with the first resistor.

The electronic device according to the invention supplies a constant output voltage even at input voltages between 70 and 264 volts and stimulates oscillation absolutely reliably even under maximum load. In addition, the device is suitable for DC and AC voltages of any frequency and merely requires a simply designed voltage regulating circuit that uses only ordinary components.

In a first embodiment of the present invention, the emitter of the second transistor is connected via a second capacitor both with the cathode of a second diode, whose anode is connected to the connection of the choke with the first capacitor or electrical consumer, and via a second resistor with the base of the switching transistor, and a third resistor is connected in parallel with the base-emitter lead of the second transistor.

In a second embodiment according to the present invention, the base of the second transistor is connected via a fourth resistor and second zener diode with the cathode of the second diode, and the base of the switching transistor is connected with the feedback choke via a series circuit of a fifth resistor and third capacitor.

DESCRIPTION OF THE PREFERRED EMBODIMENT

Figure 1:
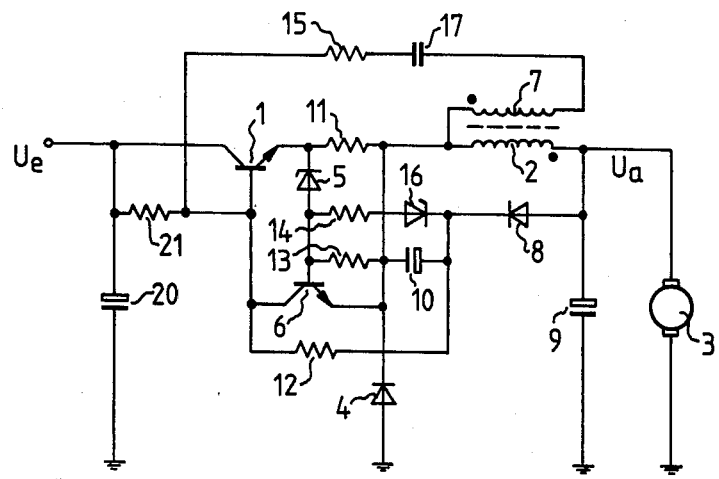
FIG. 1 is a schematic of an electronic device embodying the invention with a choke inverter with a lengthwise choke.

The electronic device shown in FIG. 1 includes a choke inverter with an lengthwise choke, consisting of a switching transistor 1 with a choke 2 connected in series with its connecting lead, as well as a first capacitor 9 connected in parallel with an electrical device 3 connected to the choke, and a first diode 4 connected to the connection of the connecting lead of switching transistor 1 with choke 2 on the one hand and on the anode side to electrical device 3 or first capacitor 9 on the other. Switching transistor 1 is connected on the collector side to an input DC voltage $U_e$, smoothed by an input capacitor 20. The input DC can be obtained optionally from a DC line or, via a rectifier, preferably a bridge-type rectifier, from an AC line. An input resistor 21 is connected parallel to the base-emitter lead of switching transistor 21.

A regulating circuit consists of a first resistor 11 connected to the junction of the emitter of switching transistor 1 to choke 2, to which resistor the series circuit of the base-emitter lead of a second transistor 6 and a first zener diode 5, with the cathode connected on the cathode side to the emitter of switching transistor 1 are connected. The collector of second transistor 6 is connected both to the base of switching transistor 1 and to a second resistor 12, which is connected via a second capacitor 10 with the emitter of second transistor 6 or via the series circuit composed of a second zener diode 16 and a fourth resistor 14 with the base of second transistor 6. The cathode of second zener diode 16 is connected to second resistor 12 and the cathode of a second diode 8, whose anode is connected to the junction of choke 2 with electrical device 3 or first capacitor 9.

A third resistor 13 is connected in parallel to the base-emitter lead of second transistor 6.

The base of switching transistor 1 is connected with one end of the winding of a feedback winding 7 via a fifth resistor 15 and a third capacitor 17, the other end of the winding being connected to the junction of first resistor 11 with choke 2.

During operation of the electronic circuit with a choke inverter with an lengthwise choke according to FIG. 1, a regulated output voltage $U_a$ determined by the switching times and pause times of the switching transistor is applied to electrical device 3 or first capacitor 9.

Figure 2:
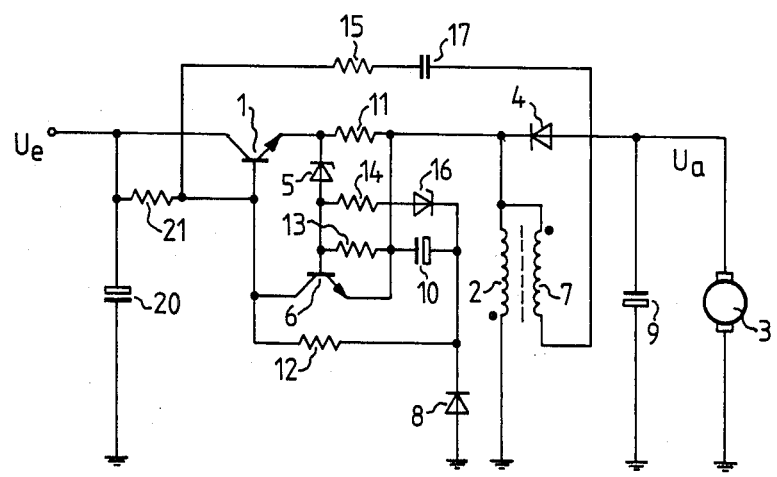
FIG. 2 is a schematic of an electronic device embodying the invention with a choke inverter with a transverse choke.

The electronic device shown in FIG. 2, with a choke inverter having a transverse choke generally corresponds to the choke inverter with a lengthwise choke shown in FIG. 1, and identical components have been given identical reference numbers. Due to the arrangement of choke 2, only the arrangement of first and second diodes 4 and 8 has been changed relative to the arrangement shown in FIG. 1, whereby first diode 4 is connected on the cathode side with first resistor 11 and on the anode side with electrical device 3 or capacitor 9 connected in parallel with electrical device 3, while second diode 8 is connected on the cathode side with the junction of second resistor 12 with second capacitor 10 or the cathode of second zener diode 16 and on the anode side to electrical device 3 or first capacitor 9.

The following is an explanation of the operation of the electronic circuits shown in FIGS. 1 and 2 with lengthwise and transverse chokes.

When a DC voltage is applied to input capacitor 20 with the positive side connected to the collector of switching transistor 1, a low base current flows through input resistor 21, serving to control switching transistor 1. The resultant emitter current flows though choke 2 and a voltage is induced in feedback winding 7, charging third capacitor 17, so that as a result of this feedback via third capacitor 17 and fifth resistor 15, switching transistor 1 suddenly conducts and is driven to saturation. If the linearly increasing collector or emitter current of switching transistor 1 evokes a voltage drop at first resistor 11, which is greater than the sum of the breakdown voltage of first zener diode 5 and the base-emitter blocking voltage of the blocked second transistor 6, second transistor 6 conducts and switching transistor 1 is blocked. This ends the flow phase and begins the blocked phase, in which first diode 4 conducts and the energy stored in choke 2 flows into first capacitor 9 or load 3. In the blocked phase, second diode 8 likewise conducts and second capacitor 10 is charged to output voltage $U_a$. When output voltage $U_a$ and hence the voltage at second capacitor 10 is greater than:

$$U_{c2} > U_{BE} \times R_{14}/R_{13} + U_{z16},$$

where $U_{c2}$ is the voltage on second capacitor 10, $U_{BE}$ is the base-emitter voltage drop at second transistor 6, $R_{13}$ and $R_{14}$ are the resistance of the third and fourth resistors, respectively, and $U_{z16}$ is the zener voltage of second zener diode 16, second transistor 6 will conduct and remain in this state beyond the end of the blocked phase, until the voltage on the second capacitor becomes:

$$U_{c2} < U_{BE} \times RF_{14}/R_{13} + U_{z16}.$$

The current flowing through second resistor 12 then flows into second transistor 6. When the voltage in second capacitor 10 has fallen below the value given in the above equation, second transistor 6 is blocked, so that the current flowing through second resistor 12 charges third capacitor 17 to the point where switching transistor 1 begins to conduct. As a result of the feedback through third capacitor 17 and fifth resistor 15, switching transistor 1 suddenly conducts and is driven in the conducting phase until saturation. Only when its linearly increasing collector or emitter current evokes the above-mentioned voltage drop at first resistor 11 does second transistor 6 conduct again and the flow phase end, so that a new blocked phase begins. As is evident from the above description of the function of the device according to the invention, commencement of oscillation of the choke inverter is ensured even when the device in under heavy load, due essentially to the fact that resistor 12, which charges third capacitor 17 connected to the base of switching transistor 1 operates. The regulating circuit is composed of ordinary components and can therefore be built in a simple and inexpensive fashion. The circuit also ensures, that, even if the input voltages fluctuate considerably, a constant output voltage is ensured, the output voltage depending essentially on the dimensioning of second zener diode 16 and resistors 13 and 14.

While the present invention has been described by way of a number of preferred embodiments, various substitutions of equivalents may be effected without departing from the spirit or scope of the invention as set forth in the appended claims.

What is claimed and desired to be secured by Letters Patent of the United States is:

1. In an electronic circuit for supplying current to an electrical device from an AC or DC voltage source of varying voltage level, said electronic circuit including a choke inverter including a switching transistor connected in series with a choke, the base of said switching transistor being connected to a regulator circuit for regulating the output voltage, whereby in the conducting phase of the switching transistor a first capacitor connected in parallel with the electrical device is charged and in the blocking phase of the switching transistor the energy stored in the choke flows through a first diode into the first capacitor which discharges through the electrical device, that improvement comprising:
  a first resistor connected between a load terminal of said switching transistor and said choke;
  a second transistor;
  a zener diode, said zener diode and the base and emitter of said second transistor forming a series circuit connected in parallel with said second transistor;
  the base of said switching transistor being connected to the collector of said second transistor; and a feedback winding magnetically coupled with said choke and connected between said base of said switching transistor and the junction of said choke and said load terminal of said switching transistor.

2. An electronic circuit as in claim 1, further comprising a second capacitor (10) connected between the emitter of said second transistor and the cathode of a second diode (8), the anode of said second diode being connected to the junction of said choke, said first capacitor and said electrical device, and also comprising a second resistor (12) connected between the emitter of said second transistor and the base of said switching transistor and a third resistor (13) connected between the base and the emitter of said second transistor.

3. An electronic circuit according to claim 2, further comprising a fourth resistor (14) and a second zener diode (16) connected in series between the base of said second transistor and the cathode of said second diode (8).

4. An electronic circuit as in claim 1, further comprising an additional resistor (15) and an additional capacitor (17) connected in series between the base of said switching transistor and said feedback choke.

5. An electronic circuit according to claim 2, further comprising an additional resistor (15) and an additional capacitor (17) connected in series between the base of said switching transistor and said feedback choke.

6. An electronic circuit as in claim 3, further comprising an additional resistor (15) and an additional capacitor (17) connected in series between the base of said switching transistor and said feedback choke.

* * * * *